United States Patent [19]
Ryan et al.

[11] Patent Number: 5,155,834
[45] Date of Patent: Oct. 13, 1992

[54] REFERENCE AND CHANGE TABLE STORAGE SYSTEM FOR VIRTUAL MEMORY DATA PROCESSING SYSTEM HAVING A PLURALITY OF PROCESSORS ACCESSING COMMON MEMORY

[75] Inventors: Robert P. Ryan, Marlborough; Kin L. Cheung, North Andover, both of Mass.

[73] Assignee: Wang Laboratories, Inc., Lowell, Mass.

[21] Appl. No.: 463,640

[22] Filed: Jan. 11, 1990

Related U.S. Application Data

[63] Continuation-in-part of Ser. No. 170,483, Mar. 18, 1988, Pat. No. 4,916,603.

[51] Int. Cl.⁵ .................... G06F 13/00; G06F 9/36
[52] U.S. Cl. .................... 395/425; 395/800; 395/400; 364/DIG. 1; 364/256.3; 364/256.4
[58] Field of Search ... 364/200 MS File, 900 MS File; 395/400, 425, 800

[56] References Cited

U.S. PATENT DOCUMENTS

| | | | |
|---|---|---|---|
| 3,840,863 | 10/1974 | Fuqua | 364/200 |
| 3,983,537 | 9/1976 | Parsons et al. | 364/200 |
| 4,042,911 | 10/1977 | Bourke et al. | 364/900 |
| 4,084,230 | 4/1978 | Matick | 364/200 |
| 4,096,568 | 6/1978 | Bennett et al. | 364/200 |
| 4,126,894 | 11/1978 | Cronshaw et al. | 364/200 |
| 4,128,875 | 12/1978 | Thurber et al. | 364/200 |
| 4,151,593 | 4/1979 | Jenkins et al. | 364/200 |
| 4,181,937 | 1/1980 | Hattori et al. | 364/200 |
| 4,277,826 | 7/1981 | Collins et al. | 364/200 |
| 4,290,104 | 9/1981 | Holtey et al. | 364/200 |
| 4,340,776 | 7/1982 | Ganz et al. | 178/3 |
| 4,410,941 | 10/1983 | Barrow et al. | 364/200 |
| 4,414,624 | 11/1983 | Summer, Jr. et al. | 364/200 |
| 4,445,170 | 4/1984 | Hughes et al. | 364/200 |
| 4,484,273 | 11/1984 | Stiffler et al. | 364/200 |
| 4,564,900 | 1/1986 | Smitt | 364/200 |
| 4,608,631 | 10/1986 | Stiffler et al. | 364/200 |
| 4,638,426 | 1/1987 | Chang et al. | 364/200 |
| 4,654,819 | 3/1987 | Stiffler et al. | 364/200 |
| 4,680,700 | 7/1987 | Hester et al. | 364/200 |
| 4,714,993 | 12/1987 | Livingston et al. | 364/200 |
| 4,748,627 | 5/1988 | Ohsawa | 371/38 |
| 4,758,993 | 7/1988 | Takemae | 365/222 |
| 4,792,895 | 12/1988 | Tallman | 364/200 |
| 4,807,189 | 2/1989 | Pinkham et al. | 365/189 |
| 4,959,770 | 9/1990 | Kondo et al. | 364/200 |

OTHER PUBLICATIONS

"Reference and Change Bit Recording" by R. Hoffman et al., IBM Tech. Disc. Bulletin, vol. 23, No. 12, May 1981.

*Primary Examiner*—Thomas C. Lee
*Assistant Examiner*—L. Donaghue
*Attorney, Agent, or Firm*—Michael H. Shanahan

[57] ABSTRACT

In a multi-processor virtual memory system 10 a Reference and Change Table (RCT) 36 is located upon a Memory Control Unit (MCU) 25. The RCT 36 is responsive to accesses to any of the Memory Modules (MMs) 24-26 and generates and maintains status bits indicative of the reference and change activity of all of page frames of the system memory that are accessible by any of the CPUs 12A-12n. In that each of the CPUs 12A-12n has access to the page frames of the system memory each of the CPUs 12A-12n is further enabled, via privileged instructions, to test (read) and reset (clear) over a system bus 16 the memory page frame status bits that are generated and stored by the RCT 36. As such, the RCT provides to multiple data processors a centralized and readily accessible store of status information relating to page frames of the system memory.

19 Claims, 8 Drawing Sheets

CIRCUIT FOR 64 BIT SYSTEM
TWO 32 BIT MODULE ON THE SAME BANK

FIG. 10

REFERENCE AND CHANGE TABLE STORAGE SYSTEM FOR VIRTUAL MEMORY DATA PROCESSING SYSTEM HAVING A PLURALITY OF PROCESSORS ACCESSING COMMON MEMORY

CROSS REFERENCE TO RELATED PATENT APPLICATION

This application is a continuation-in-part application of Ser. No. 07/170,483 filed Mar. 18, 1988, now U.S. Pat. No. 4,916,603, issued Apr. 10, 1990.

FIELD OF THE INVENTION

This invention relates in general to digital data processing systems and, in particular, to a digital data processing system having a plurality of data processors coupled to a common memory, the memory being associated with a reference and change table accessible by all of the processors.

BACKGROUND OF THE INVENTION:

In a virtual memory digital data processing system a central processing unit (CPU) issues virtual memory addresses which are translated into real, or physical, memory addresses. Such a virtual memory system typically comprises a physical memory such as random access memory (RAM) typically having a number of storage locations less than the address capability of the CPU. The virtual memory system also typically comprises a mass storage system such as a magnetic disk or tape having a storage capacity which typically far exceeds that of the physical memory size, and also a virtual memory control mechanism. The virtual memory control mechanism typically comprises circuitry adapted for translating a CPU generated virtual address into a physical memory address, circuitry adapted for determining if the data addressed by the CPU is currently resident in the physical memory and circuitry adapted for suspending a CPU access until the desired data can be retrieved from the mass storage device and stored in the physical memory. Data retrieved from the mass storage device and stored in physical memory may also be subsequently rerecorded within the mass storage device. The data transferred between mass storage and physical memory is typically organized into blocks of data having, for a particular data processing system, a predefined format. One format is that of a variable data length segment. Another format is that of a fixed data length page. A still further format is a hybrid segment/page type of data block.

In any type of virtual memory data processing system a desired feature is that the limited and valuable resources of the physical memory be efficiently utilized. Inasmuch as a CPU access to data resident in physical memory may occur at least an order of magnitude faster than an access to data which is not resident in physical memory and which must therefore be retrieved from the mass storage device, it can be appreciated that the continued residency of appropriate data within the physical memory is a important concern. Another important concern is that data which is modified by the CPU, while resident in physical memory, be accurately rerecorded into the mass storage device. In order to accomplish these important goals it has been known to provide the virtual memory control mechanism with circuitry adapted for recording both the occurrence of a CPU access to a particular block of data in physical memory and also whether the data was modified by a write type of access. Such circuitry may be referred to as a reference and change table (RCT) and typically comprises a memory device having a predetermined number of storage locations for recording the occurrence of a CPU access to a particular data block and whether the access was a write type of access.

One particular problem with conventional RCTs is that they are embodied in a single logical element or a plurality of logical elements and are typically disposed within the virtual memory control system. These centralized RCTs typically have a fixed storage capacity which may represent a storage capacity substantially equal to the maximum virtual address capability of the CPU. For example, if the CPU has 24 address bits, the upper eight bits may define a particular page of data within virtual memory while the lower 16 bits may represent an index into the page of virtual memory. Such a CPU would therefore have a virtual memory space organized as 256 pages each comprising 65,536 memory locations. The RCT would consequently be required to have, for example, 256 memory locations (one for each page). However, if the data processing system only has the equivalent of 16 pages of physical memory installed, it can be appreciated that additional system cost, represented at least by the unused capacity of the RCT, has been needlessly incurred. Inasmuch as many modern CPUs, which typically comprise a microprocessor device, have a virtual memory addressing capability of hundreds of megabytes of data or more, the required storage capacity of an associated centralized RCT may be unacceptably large. Even if, for a given system, the RCT has a fixed, smaller storage capacity than the maximum virtual memory address capability of the CPU the RCT capacity may still need to be made larger than necessary in order to accommodate projected increases in system memory capacity. The fixed storage capacity of such a reduced capacity RCT may then subsequently prove disadvantageous if it is desired to increase the system storage capacity beyond the originally designed capacity, such as by attaching additional memory modules to the system. The fixed size of the RCT thus imposes a maximum limit on the virtual and physical memory space of the system.

Another problem is presented for a virtual memory multiprocessor data processing system having a common memory accessed by all of the processors. Such systems typically provide each data processor with a local reference and change table for recording accesses to the common memory. As such, communication and coordination is required between the various data processors in order to determine the contents of each of the reference and change tables in regard to the status of a particular page of the common memory.

It is therefore one object of the invention to provide a centralized memory reference and change table that is accessible by all data processors of a multi-processor system, the reference and change table recording accesses to and a type of access to units of a common memory area.

It is another object of the invention to provide in a virtual memory multi-processor system a centralized memory reference and change table that is accessible by all data processors of a multi-processor system.

SUMMARY OF THE INVENTION

The foregoing problems are overcome and the objects of the invention are met by a reference and change table storage device for a virtual memory data processing system. The system is of a type having a plurality of data processors coupled through a system bus to a common physical memory. The physical memory is organized into n predetermined numbers of addressable units each of which comprises a plurality of physical memory address locations. The reference and change table storage device includes a first storage array for recording an occurrence of an access to a specific address location within the physical memory by one of the data processors. The reference and change table storage device further includes a second storage array for recording a type of access to the specific address location. In addition the reference and change table storage device includes circuitry, responsive to a first type of access by one of the data processors, for outputting to the system bus a content of a specified location within the first and the second storage arrays. The reference and change table storage device further includes circuitry, responsive to a second type of access by one of the data processors, for resetting a specified location within the storage arrays to indicate, for the corresponding memory unit, a nonaccessed condition. Certain privileged instruction types are employed by the data processors for reading the system bus.

In accordance with a presently preferred embodiment of the invention there is provided for use in multi-processor virtual memory system a Reference and Change Table located upon a Memory Control Unit. The Reference and Change Table is responsive to accesses to any of a plurality of Memory Modules coupled to the Memory Control Unit to generate and maintain status bits indicative of the reference and change activity of all page frames of system memory accessible by any of the system CPUs. Each of the CPUs is enabled, via privileged instruction types, to test (read) and reset (clear) over a system bus specified ones of the memory page frame status bits that are generated and stored by the Reference and Change Table. The Reference and Change Table thus provides to multiple data processors a centralized and readily accessible store of status information relating to page frames of a commonly accessed system memory.

BRIEF DESCRIPTION OF THE DRAWINGS

These and other aspects of the invention will be made more apparent hereinafter in the Detailed Description of the Invention read in conjunction with the accompanying drawing, wherein:

FIG. 3 is a schematic diagram showing one embodiment of circuitry operable for implementing the RCT of FIG. 2a;

DETAILED DESCRIPTION OF THE INVENTION

Figure 1:
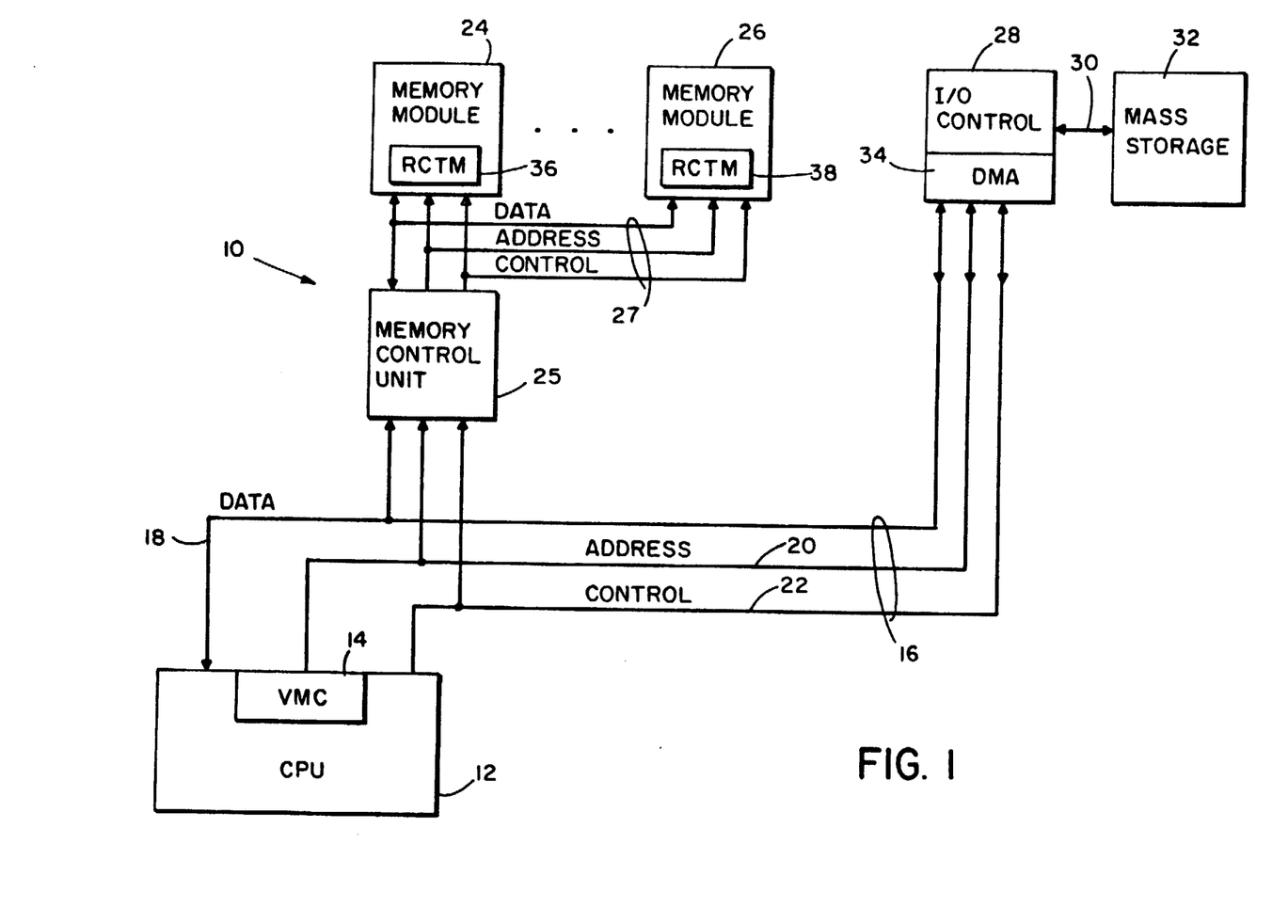
FIG. 1 is a block diagram of an illustrative virtual memory data processing system having a modular reference and change table distributed over a plurality of memory modules.

Referring now to FIG. 1 there is shown in block diagram form a virtual memory data processing system 10 comprised of a central processing unit (CPU) 12 having a virtual memory control (VMC) 14. CPU 12 is coupled to a system bus 16 which comprises a plurality of groups of signal lines, such as a bidirectional data bus signal line group 18, an address bus signal line group 20 and a control signal line group 22. Data bus signal group 18 is organized in byte fashion and may comprise, for example, 32 or 64 bidirectional signal lines for coupling data between the CPU 12 and a first memory unit, or module 24, a second memory module 26, and an I/O control 28. The data bus signal group 18 may also comprise additional bits related to the operation of an error detection and correction circuit (EDAC), not shown. The EDAC is typically disposed within CPU 12 or VMC 14. Also coupled to modules 24, 26 and 28 are the address bus 20 and control bus 22. Of course, the system 10 may comprise either less than or more than the two memory modules 24 and 26.

In a preferred embodiment of the invention memory modules 24 and 26 are coupled to CPU 12 through a memory control unit (MCU) 25 via a memory bus 27. MCU 25 in the preferred embodiment performs memory timing, selection, control and refresh functions; such as multiplexing the address bus 20 into memory row and column addresses and asserting row and column address strobe signals.

Address bus 20 is output by VMC 14, the logical state of the address bus 20 being expressive of a physical address within, for example, one of the memory modules 24 or 26. VMC 14 is operable for translating a virtual memory address generated by CPU 12 into a physical memory address. Control bus 22 typically comprises memory and I/O read and write signal lines and other signal lines such as lines expressive of bus error conditions, bus arbitration states and bus timing and synchronization.

I/O control 28 may be coupled via a bus 30 to an I/O device such as a data communications port or, as illustrated, to a mass storage unit 32 which may comprise a rotating magnetic disk, a magnetic tape or any other storage device operable for storing data and computer program instructions. I/O control 28 may also comprise a direct memory access (DMA) circuit 34 which is operable for directly transferring data to and from the mass storage unit 32 and memory locations within either the memory module 24 or 26. Movement of data between mass storage unit 32 and memory is typically characterized as an I/O type of memory access as opposed to a CPU 12 memory access. As such, control bus 22 comprises an I/O signal line which is indicative of whether a given memory access is an I/O access. Of course, in some systems the DMA 34 may be physically located within the CPU 12.

Each of the memory modules 24 and 26 may comprise a memory reference and change table module (RCTM) 36 and 38, respectively, as disclosed in U.S. patent application Ser. No. 07/170,483, filed Mar. 18, 1988, entitled "Distributed Reference and Change Table for a Virtual Memory System", now U.S. Pat. No. 4,916,603, issued Apr. 10, 1990, by Robert Ryan et al.

Figure 10:
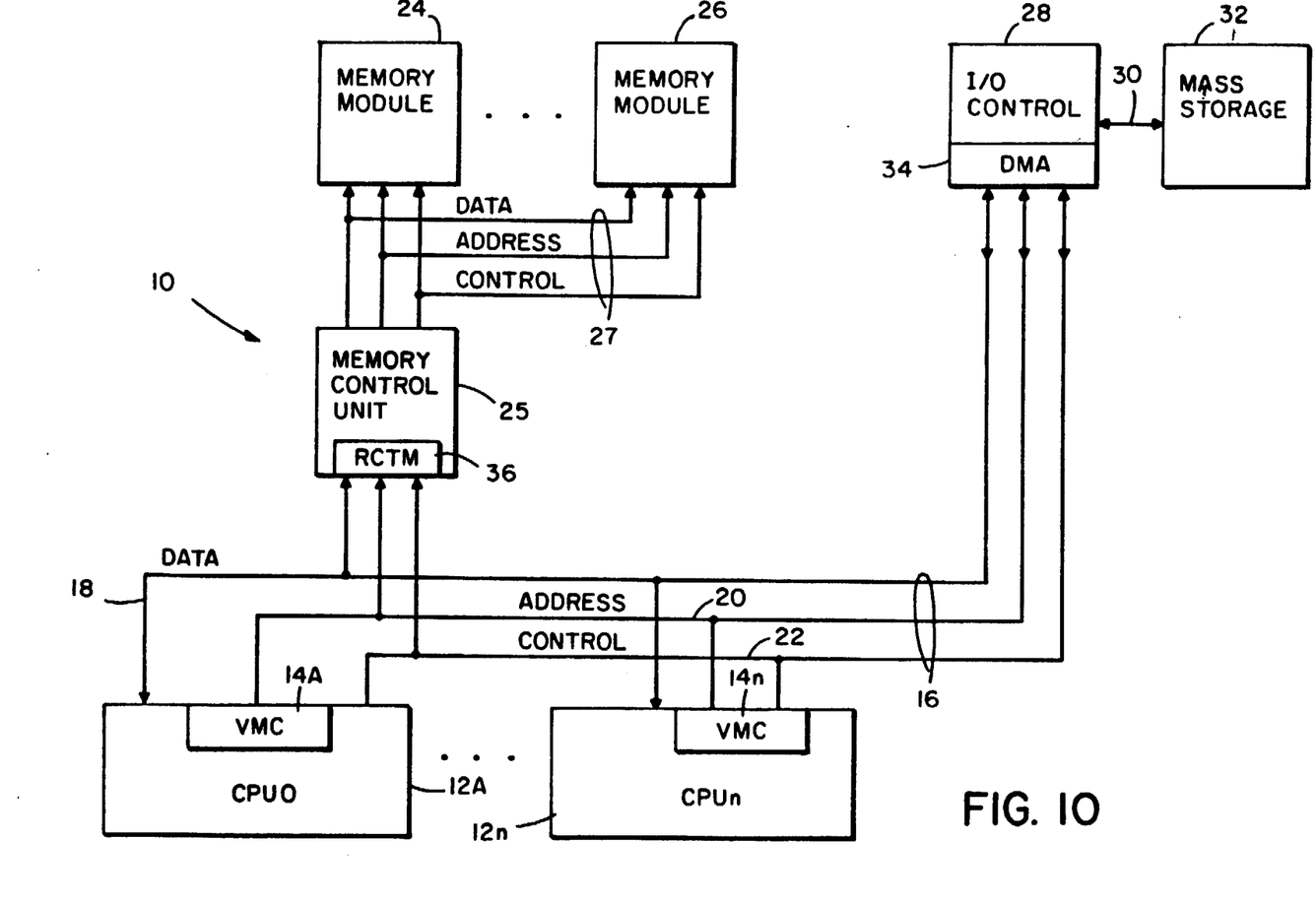
FIG. 10 is a block diagram of an illustrative virtual memory multi-processor data processing system having a centralized reference and change table that is readily accessible by each of the processors.

Referring to FIG. 10 there is shown another embodiment of the system 10 that is constructed and operated in accordance with a presently preferred embodiment of the invention. In FIG. 10 those elements having reference numerals in common with FIG. 1 operate as described above in relation to the description of the system 10 of FIG. 1.

Some salient differences between the systems of FIG. 1 and FIG. 10 are the system of FIG. 10 includes a plurality (n) of substantially identically constructed CPUs designated CPU0 12A through CPUn 12n. In the presently preferred embodiment of the invention the system 10 may include up to four of the CPUs 12 (CPU-0-CPU3). Each of the CPUs 12A-12n executes an associated operating system (OS) program that, in the presently preferred embodiment of the invention, is known as the VS Operating System available from Wang Laboratories of Lowell, Mass. Each of the CPUs 12A-12n may be substantially identical to the CPU of FIG. 1. As such, each of the CPUs includes an associated VMC 14A-14n. The address bus 20 is comprised of 28 address lines and is coupled to each VMC 14, the state of the address bus 20 being expressive of a physical address within, for example, one of the memory modules 24 or 26. Each VMC 14A-14n translates a virtual memory address generated by the associated CPU 12A-12n into a physical memory address. The control bus 22 comprises memory and I/O read and write signal lines and other signal lines such as lines expressive of bus error conditions, bus arbitration states, bus access type and bus timing and synchronization. The data bus 18 is comprised, in this embodiment, of 64 data lines.

Memory modules 24 and 26 are each coupled to the CPUs 12A-12n through the MCU 25 via the memory bus 27. MCU 25 performs memory timing, selection, control and refresh function; such as multiplexing the address bus 20 into memory row and column addresses and asserting row and column address strobe signals. The MCU 25 also performs arbitration to manage competing requests for access to the Memory Modules 24 and 26. Memory arbitration is accomplished with a prioritized round-robin technique.

In this presently preferred embodiment of the invention the MCU 25 further includes the RCTM 36. The RCTM 36 is coupled to certain of the system bus 16 signal lines in a manner to be described below. In that the RCTM 36 is located upon the MCU 25 and is responsive to accesses to any of the MMs 24-26 the RCTM contains status bits indicative of the reference and change activity of all of page frames of the system memory that is accessible by any of the CPUs 12A-12n. In that each of the CPUs 12A-12n has access to the page frames of the system memory each of the CPUs 12A-12n is further enabled, via VS privileged instructions, to test (read) and reset (clear) through the system bus 16 the memory page frame status bits that are generated and stored by the RCTM 36. As such the RCTM 36 provides to the multiple data processors, in a centralized and readily accessible location, status information relating to page frames of memory stored within the system memory.

Figure 2A:
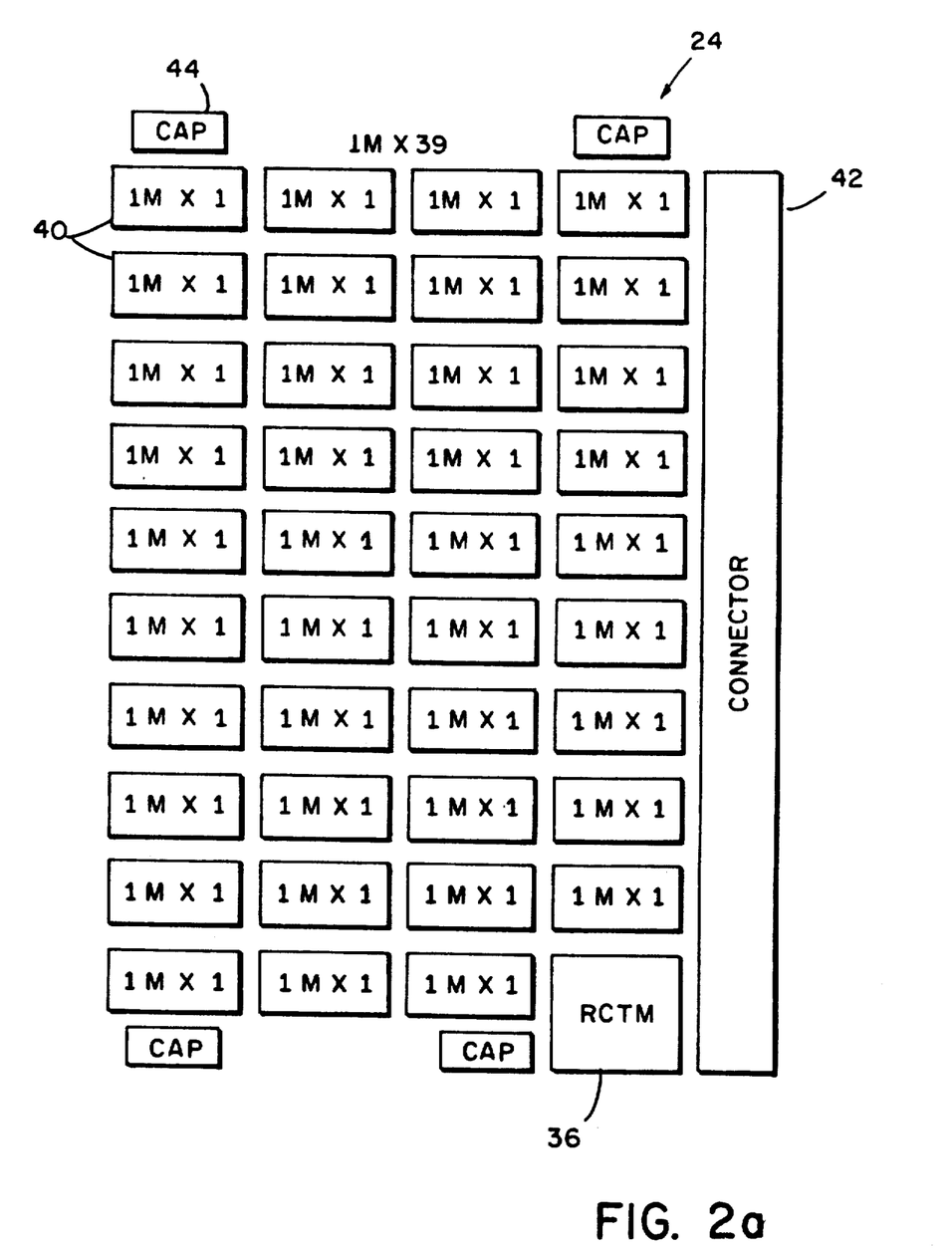
FIG. 2a is a block diagram showing one of the memory modules of FIG. 1, the memory module having an integral RCT in accordance with one aspect of the invention.

Referring now to FIG. 2a there is shown in block diagram form one of the memory modules of FIG. 1, specifically, the memory module 24. As can be seen, memory module 24 comprises a plurality of memory devices 40, which in an illustrative embodiment of the invention are each dynamic random access memory (DRAM). In the embodiment shown in FIG. 2a the memory module 24 comprises 39 DRAM devices, each of which is operable for storing approximately one million bits of information. There are 39 DRAM devices 40 illustrated, 32 of which store program instructions or data, that is, four eight-bit bytes of program instructions or data. The remaining seven DRAM devices store error detection and correction bits which are utilized to detect double bit and correct single bit data errors which may occur within the DRAM devices 40. These seven error detection and correction bits are optional and may not be utilized in some systems. The memory module 24 may also comprise a connector 42 which is operable for coupling a plurality of digital signals from, for example, the bus 27 to the memory module 24. These signals include operating power (+5 V and 0 V), a plurality of multiplexed address lines (A0-A9), a plurality of data lines (D0-D31 or D0-D63), the error detection and correction data bits (CB0-CB6), and a plurality of memory control signal lines (RAS*, CAS*, W*). The memory module 24 also comprises the aforementioned RCTM 36, which is also coupled to certain of the signal lines (A0-A9, RAS*, CAS*, W*, RRCT*, TRCT*, I/O and UPPER) in a manner which will be disclosed below.

In the embodiment of the invention disclosed in U.S. Pat. No. 4,916,603 the MCU 25 includes the RCTM 36 which is coupled to address signal lines and to the memory control and other signals (RAS*, CAS*, W*, RRCT*, TRCT*, I/O and UPPER) in a manner disclosed below.

The memory module 24 also comprises a substrate, which may be a printed circuit card of well known construction having the plurality of memory devices soldered or otherwise coupled thereto, including the RCTM 36 and other components such as power supply filtering capacitors 44. In this regard, RCTM 36 may be comprised of a plurality of discrete logic devices coupled together as will be described. Preferably, RCTM 36 is a unitary integrated circuit device, such as a gate array, which achieves a lower power consumption and a lower surface area utilization than a plurality of devices.

It should be appreciated that the modular RCTM of the invention is not limited to being employed upon discrete memory modules coupled to a system bus. For example, in some systems it may be desirable to provide one unitary substrate having all of the system components physically mounted thereon. In such a system one or more memory units would be attached to the substrate along with a data processor, a system bus, VMC and other components. Each memory unit may then be associated with one of the modular RCTMs. In such a unitary system it may not be a requirement that the RCTMs be physically adjacent the memory units but may instead be physically separated therefrom. However, the RCTMs would be coupled to the appropriate signal lines for recording the reference and change status of an associated memory unit, such as a four megabyte unit.

The memory module shown in FIG. 2a is capable of storing in excess of four megabytes of data, or one megaword, each word being comprised of 32 bits of data. It can be appreciated that two such modules may be operated in parallel to store words having 64 bits of data, four modules may store words having 128 bits of data, etc.

Figure 2B:
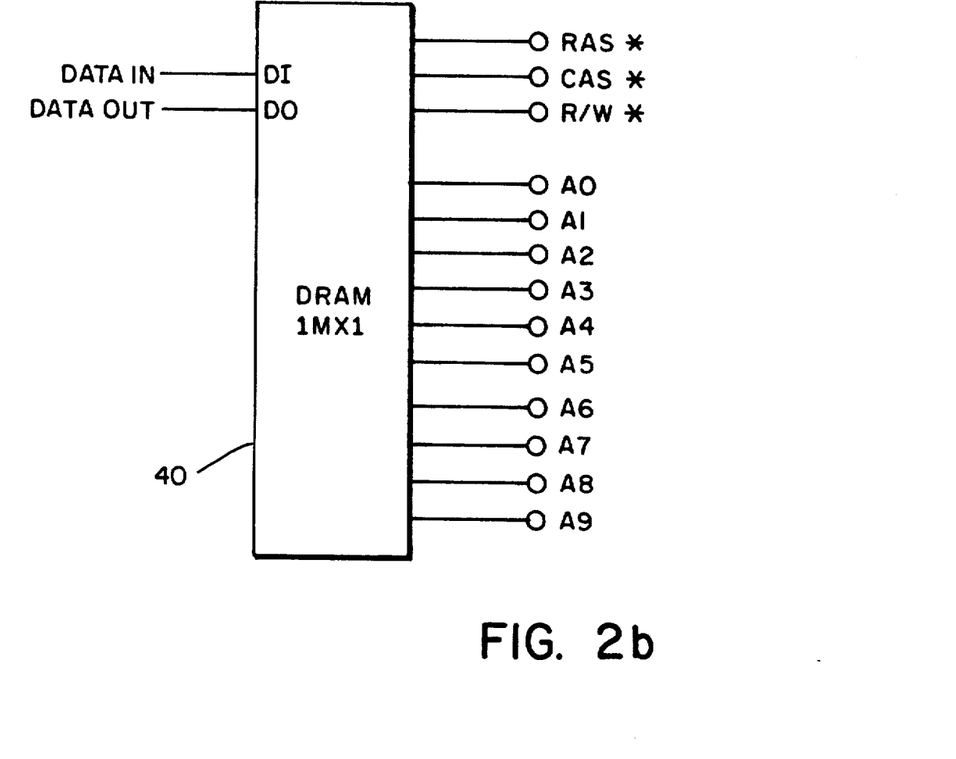
FIG. 2b is a block diagram showing a representative one of the memories 40.
Figure 2C:
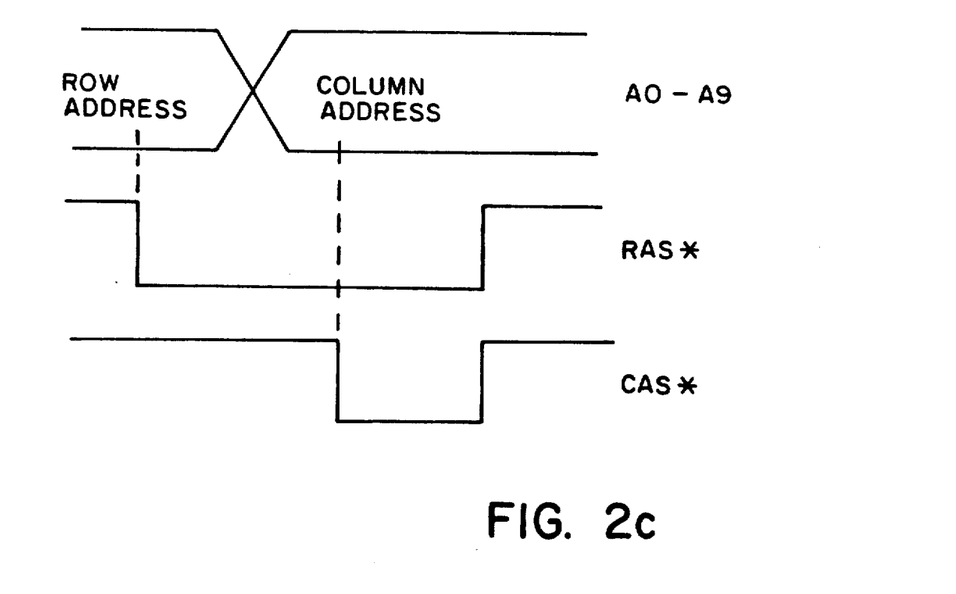
FIG. 2c is a representative timing diagram showing the operation of RAS* and CAS* for the memory 40 of FIG. 2b.

Referring now to FIGS. 2b and 2c there is shown a well known DRAM having a Data In and a Data Out signal line and a plurality of address lines A0 through A9. The DRAM 40 also has a RAS*, CAS*, and R/W* signal control line. In order to achieve a large data storage device with a minimum of input signal pins and, hence, a small package size, such DRAMs typically multiplex the address lines such that at one time in the operation of the device the address lines are characterized as row address lines under the control of RAS* and at another time in the cycle are characterized as column address lines under the control of CAS*. The device shown in FIG. 2b has ten address signal pins and, thus, has a total of 20 address inputs which yield a device having a total of 1,048,567 bit storage locations. Of course, other DRAMs may have more or less than ten address inputs such as 64K and 256k bit devices and other devices may store more than one bit of data, such as devices adapted to simultaneously store and retrieve four bits of data.

As shown in FIG. 2c one conventional addressing mode for such a DRAM results in RAS* being asserted for latching within the RAM the row address lines appearing on A0-A9. Subsequent to the assertion of RAS* the state of the address lines A0-A9 are switched to the desired column address and CAS* is asserted. The assertion of CAS* also typically either stores within the device or reads from the device, depending upon the state of R/W*, a bit of data at the specified row and column address.

Figure 3:
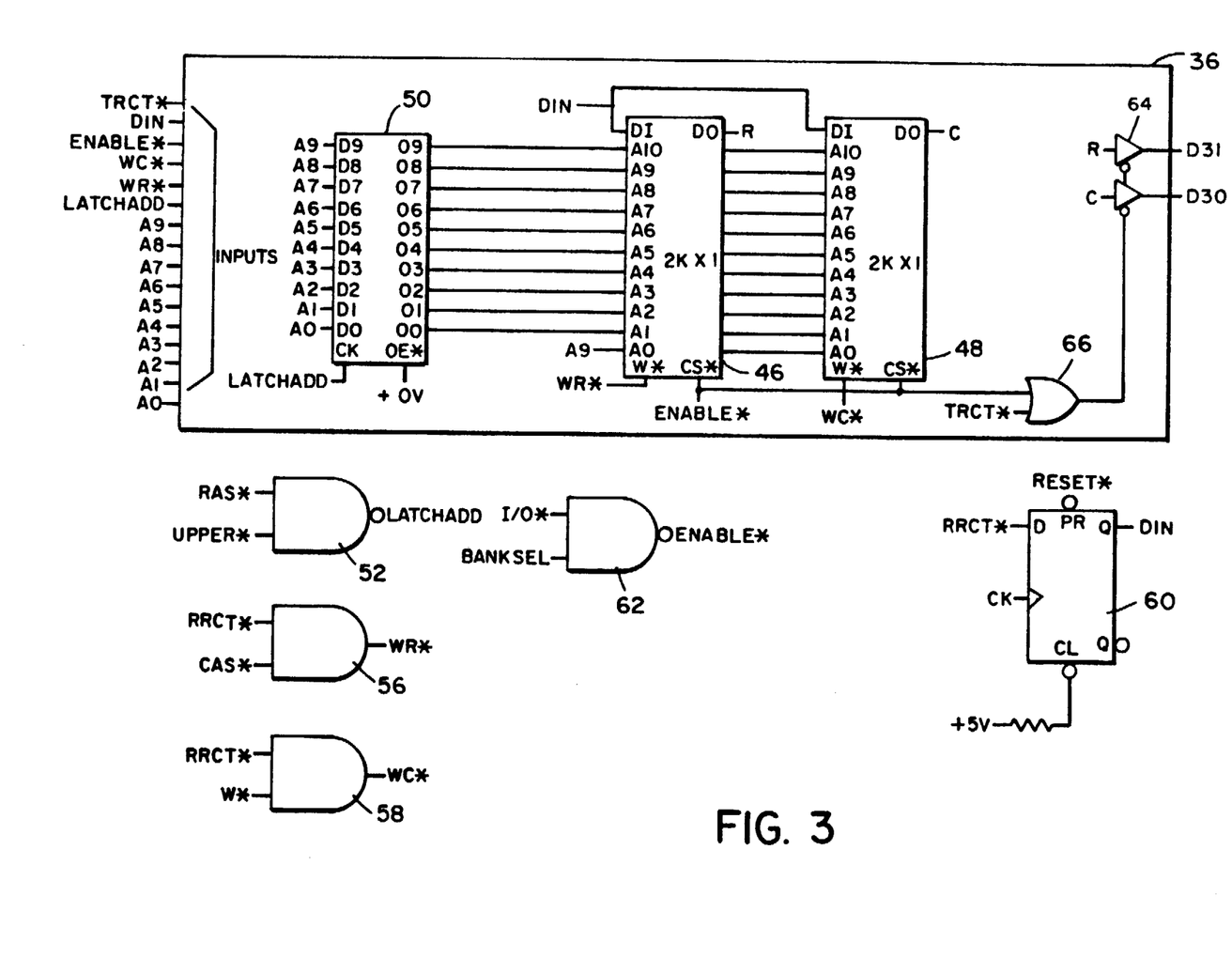
Figure 4A:
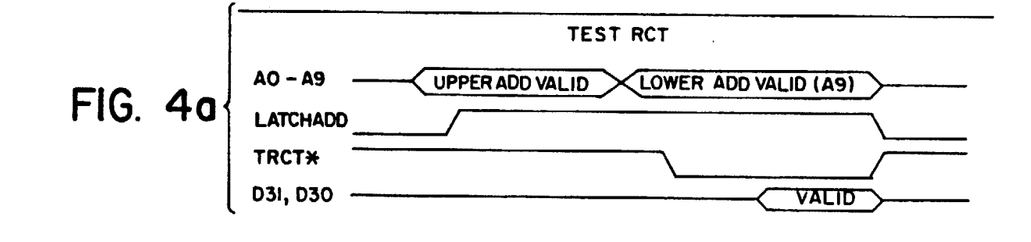
FIGS. 4a and 4b are timing diagrams which illustrate the operation of the circuitry of FIG. 3.
Figure 4B:
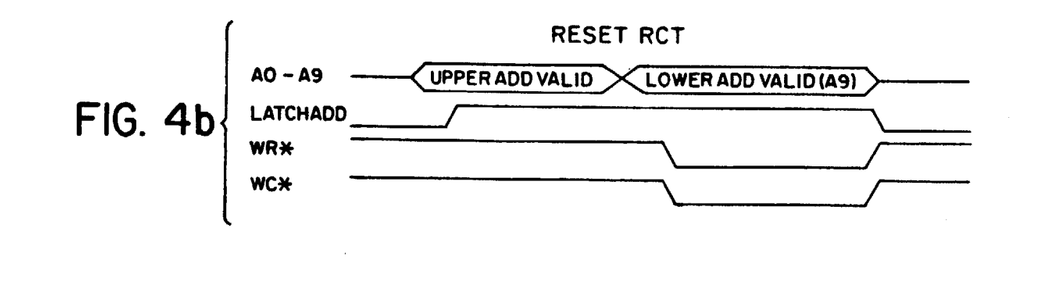

Referring now to FIG. 3, in conjunction with FIGS. 4a and 4b, there is shown an illustrative schematic diagram of the RCTM 36 of FIG. 2a and timing diagrams which illustrate the operation of the RCTM. RCTM 36 can be seen to comprise a first memory device 46 and a second memory device 48. Memory devices 46 and 48 each have, in this embodiment of the invention, a storage capacity of 2048 bits of data. The 2048 bit storage capacity of each of the memory devices 46 and 48 corresponds to 2048 blocks, or page frames, of physical memory; that is 2048 page frames each comprising 512 32 bit words of data. Memory device 46 is configured such that an access by CPU 12 to the memory devices 40 on the memory module 24 results in a corresponding bit being set to a logic one condition. Memory device 48 is configured such that a write access to a memory device upon the memory module also results in a corresponding bit being set to a logic one. Thus, it can be seen that memory device 46 records the occurrence of a reference to a particular page of data while memory device 48 further records the occurrence of a write, or change, of a particular page of data.

In order to accomplish these functions memory devices 46 and 48 have 11 address inputs (A0-A10). A1-A10 are coupled to the output of a ten bit latch 50 which latches the state of the A0-A9 address bits from the address bus 20. This latching function may be accomplished by the falling edge of the memory row address strobe (RAS*). The falling edge of RAS* occurs during the strobing of the row address into the memory devices 40 of FIG. 2a. RAS* is applied to a clock input of latch 50 via NAND gate 52. A second input to NAND gate 52 is a normally high signal UPPER*, the operation of which will be described hereinafter. The eleventh address input to memory devices 46 and 48 is subsequently applied after the falling edge of RAS*, being the A9 address signal, which is typically applied during the column address strobe (CAS*) portion of the memory 40 access cycle. Thus, it can be seen that the address appearing on the 11 address inputs to memory devices 46 and 48 defines one page of 2048 pages of physical memory installed upon the module, the address inputs being decoded by an address decoding means which comprises at least circuitry within the memory devices 46 and 48.

Figure 6:
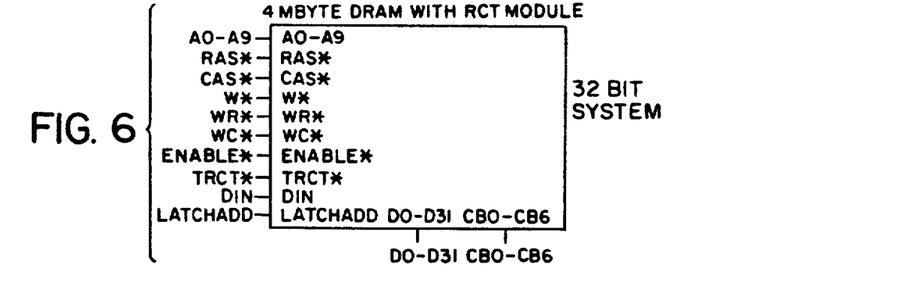
FIG. 6 is a block diagram of a 32 data bit memory module showing a portion of the signal lines coupled thereto.

It should be noted that a presently preferred embodiment of a memory module described herein comprises, as illustrated in FIG. 6, 1,048,567 data words each comprising 32 bits of data, for a memory module storage capacity of more than four million bytes of data. In other embodiments of the invention the memory module may comprise more or less than this number of data storage locations. The memory devices 46 and 48 in these other, unillustrated, embodiments will correspondingly have fewer or more storage locations. Also, if a page frame of data is defined to be other than 512 data words, such as 256 or 1024 data words, the storage capacity of each of the memory devices 46 and 48 may also differ from that shown herein. It should also be noted that the presently preferred embodiment of the invention is shown to utilize dynamic random access memory, such memories typically requiring the RAS* and CAS* timing signals. However, in other unillustrated embodiments of the invention the memory devices 40 may be static type memory devices which do not require RAS* and CAS* timing signals. In general, any type of memory device, such as bubble memory, may be utilized upon a memory module 24 or 26.

For the embodiment of FIG. 10 the RCTM 36 is provided with sufficient address inputs and storage locations to record accesses to a number of memory page frames expressive of a maximum capacity of the common system memory, as is described below.

Coupled to a write input (W*) of memory device 46 is an AND gate 56 having as inputs the CAS* memory timing signal and a read reference and change table (RRCT*) signal, the operation of which will be described hereinafter. At the completion of the CAS* portion of the memory cycle the logic state appearing at the data input (DI) of memory device 46 will be stored within the location addressed by the state of address line A0-A10. The DI input of memory device 46 is coupled to the output of a flip/flop (FF) 60 which has a Read Reference and Change Table (RRCT*) signal coupled to a D input thereof and a clock signal coupled to the clock input.

During normal memory accesses RRCT* is a logic one; making DIN normally a logic one. Thus, a logic one is stored within the memory device 46 at a location corresponding to the page frame addressed by CPU 12. The storage of such a logic one signal is indicative of a reference to a particular page frame by the CPU 12.

Memory device 48 is similarly coupled to the address signals and the output of FF 60 and, further, has an AND gate 58 coupled to the W* thereof, the AND gate 58 having as inputs the memory write (W*) timing signal and the RRCT* timing signal. The state of the W* timing signal is indicative of a CPU 12 write access to the memories 40 of memory module 24. The assertion of W* stores a logic one in the memory location addressed by address inputs A0-A10 of memory device 48. This is indicative of a change to the corresponding page frame of physical memory. During a CPU 12 read access the W* signal line is not asserted. Thus, only the corresponding bit in memory device 46 is set. Only during a CPU 12 write access to a particular page of physical memory are both the reference and change bits set in devices 46 and 48, respectively.

Memory devices 46 and 48 each have a chip select input (CS*) which is normally required to be at a logic low state in order to read or write data within the memory device. The CS* signals of memory devices 46 and 48 are coupled, via NAND gate 62, to an active low signal I/O*, which is normally at a logic zero state and to an active high bank select (BANK SEL) signal. During a CPU 12 access to the memories 40 memory devices 46 and 48 are enabled for accesses by the I/O* signal being high, or deasserted. The BANK SEL input to NAND gate 62 is high when the bank of memory associated with RCT 36 is selected. The combination of I/O* being deasserted, or high, and BANK SEL being asserted drives the output of NAND gate 62 low, thereby selecting both memory devices 46 and 48.

Figure 7:
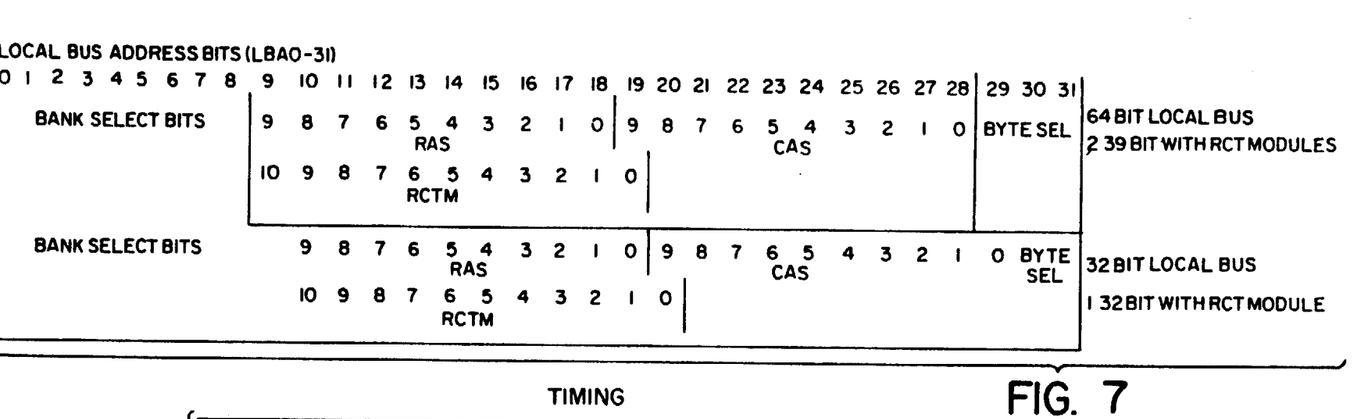
FIG. 7 is a graph showing the allocation of address bits for a 32 bit data word and for a 64 bit data word.

As can be seen in FIG. 7 a 32 bit local address bus has, for a 32 bit data bus embodiment, ten MSB bits as bank select addresses. A 64 bit data bus system has nine MSB address bus bits as bank select addresses. It can be appreciated that a 32 data bit system comprises four bytes of data per word while a 64 data bit system comprises eight bytes of data per word. Byte selection is accomplished by decoding either two or three LSB address bits. Such bank and byte select decoding is typically accomplished by address decoding means within the MCU 25.

The I/O* signal is provided to prevent the operation of memory devices 46 and 48 during an I/O type of memory 40 access, such as when the I/O controller 28 is storing or retrieving data within the memories 40.

It can be appreciated that in order to be useful the information stored within memory devices 46 and 48 must be operable for at least being read and possibly modified by a physical memory controlling device, such as a software routine executed by the CPU 12 which manages the physical memory. For example, it may be desirable after a predetermined interval of time to examine the memory device 46 to determine which pages of memory have been accessed by CPU 12 and which pages have not been accessed. If, after a given interval of time, one or more pages of data have not been accessed by CPU 12 the continued residency of these pages of data within the physical memory may be unnecessary. Thus, it may be desirable in some situations to remove an unreferenced page of data from memory and to store in its place another page of data, such as a page of memory which is currently being requested by the CPU 12. It may also be desirable at this time to determine if the page of data has been changed by the CPU 12 during a memory write cycle. If it is determined that a page of data which is to be removed from the physical memory has been changed it may further be desirable to store the changed data on the mass storage device 32. If the page of data has not been changed, whether it has been referenced or not, the restorage of the data is usually unnecessary. That is, new data may be written over the current data within the page without having to first store the currently resident data within mass storage 32, it being assumed that a copy of the page exists within the mass storage device 32.

This aspect of the invention is especially advantageous in the embodiment of FIG. 10 wherein a plurality of the CPUs 12 each have access over the system bus 16 to the RCTM 36 information.

In order to accomplish these desirable functions the RCTM 36 is operable for having individual bits of the memory devices 46 and 48 selectively reset to a logic zero condition. This is accomplished by asserting the reset reference and change table (RRCT*) signal in conjunction with the desired address of the page within the memory devices 46 and 48. As can be seen in FIG. 3 and 4b, when RRCT* is low, or asserted, the data input (DIN) to each of the memory devices 46 and 48 is at a logic zero condition via F/F 60. The assertion of RRCT*, being coupled through AND gates 56 and 58 to the write inputs of memory devices 46 and 48, respectively, causes a logic zero to be written into the addressed memory location. The address inputs A0-A9 are first set up as previously described, the address bits being latched into latch 50 by the assertion of signal UPPER*. The resetting of bits within memory devices 46 and 48 is accomplished, for example, when a new block of data is stored within the physical memory.

In order to read the reference and change table data the RCTM 36 is provided with a test reference and change table (TRCT*) signal. Data read out of memory devices 46 and 48, as determined by address inputs A0-A10, is provided to a buffer 64 which has as inputs the signals R (reference) and C (change) which are supplied from the data out (DO) outputs of memory devices 46 and 48, respectively. The TRCT* signal is provided, via OR gate 66, to an output enable (OE*) input of buffer 64 to cause the buffer 64 to place the logic states of R and C on a pair of outputs coupled to the most significant bit (MSB) and the second most significant bit (MSB-1) of the data bus. Thus, the CPU 12 is enabled to read the addressed location within memory devices 46 and 48 to determine the reference and change status of the corresponding page of physical memory. Preferably, these accesses to RCTM 36 as defined by TRCT* and RRCT*, are not memory-type accesses to prevent the storage of reference and change bits within memory devices 46 and 48. In accordance with this aspect of the invention RRCT* and TRCT* are asserted by the execution of operating system privileged instructions, that is, instructions that cannot be executed by a user's program. Specifically, these privileged instructions are instructions that operate in the I/O address space.

Based upon the foregoing description it can be appreciated that the use of the invention provides several valuable advantages in a virtual memory data processing system. For example, in accordance with one embodiment of the invention the reference and change table is not centralized nor need it be physically adjacent the CPU 12 or the VMC 14. Instead, the RCT is distributed throughout the physical memory space of the data processing system 10. Thus, additional memory modules may be attached to the system, each of the memory modules having an internal, modular RCTM for recording the reference and change activity upon that particular memory module. The data processing system may have its physical memory capacity expanded without exceeding the storage capability of any one particular RCTM. Also, the virtual memory data processing system 10 is not burdened with excess cost and complexity by having a unitary reference and change table which has a predetermined storage capacity which far exceeds the actual physical memory storage capacity of the system.

In summary, the virtual memory data processing system 10 is provided with a flexible and expandable reference and change table which is expanded as physical memory capacity is attached to the system, thereby providing for a reduction in system cost and the readily accomplished memory expansion of the system. Such a readily accomplished memory expansion is especially advantageous for those systems which have their physical memory capacity increased at a time subsequent to the initial installation of the system. In other words, the system reference and change table is automatically expanded during the installation of one or more additional memory modules.

In the presently preferred multi-processor embodiment of the invention the RCTM 36 is located upon the MCU 25. In that the RCTM 36 is located upon the MCU 25 and is responsive to accesses made to any of the MMs 24-26 the RCTM 36 contains status bits indicative of the reference and change activity of all of page frames of the system memory that are accessed by any of the CPUs 12A-12n. In that each of the CPUs 12A-12n has access to the page frames of the system memory each of the CPUs 12A-12n is further enabled, via the VS-privileged instructions, to test (read) and reset (clear) over the system bus 16 the memory page frame status bits that are generated and stored by the RCTM 36. As such, the RCTM of the presently preferred embodiment of the invention provides to multiple data processors a centralized and readily accessible store of status information relating to page frames of memory stored within the system memory.

In a presently preferred embodiment of the invention, having a 28 bit memory address, 256M Bytes of physical memory can be addressed. The RCTM 36 may be provided as two devices, each containing 128K bits of storage organized as two 64K×1 memory devices. As such, each RCTM 36 device is capable of storing reference and change bits for 128M Bytes of physical memory organized as 2K byte page frames. In a presently preferred embodiment of the invention the RCTM 36 is provided as four 64K×1 memory devices, two for storing change bits and two for storing reference bits. The MCU 25 arbitrates accesses to the RCTM 36 by the CPUs 12A-12n in a manner similar to that employed to manage accesses to the physical memory. That is, the MCU 25 detects a request for access, arbitrates the request employing the prioritized round-robin technique, decodes memory access control lines 22 from the bus 16 into an access type, asserts the applicable TRCT* or RRCT* signal ine, and performs the access to the specified RCTM 36 device.

Figure 5:
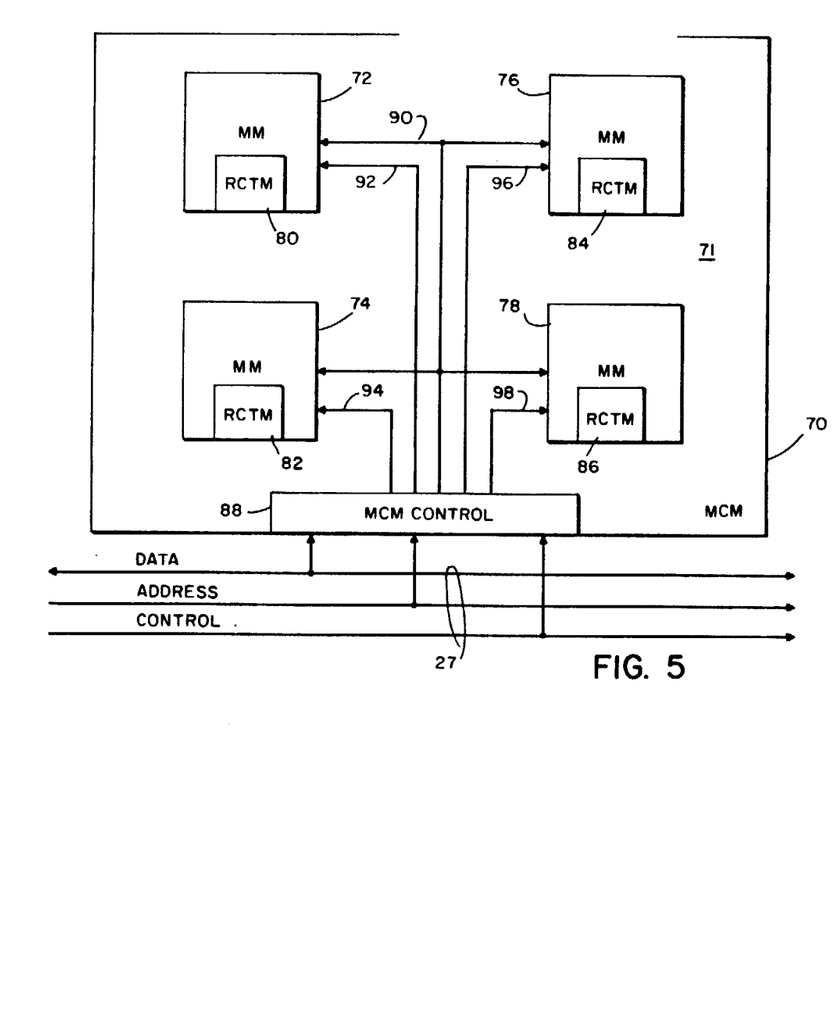
FIG. 5 is a block diagram showing a plurality of the memory modules of FIG. 2a, each having an integral reference and change table, each being disposed upon a common memory carrier module.

Referring to FIG. 5 there is shown a memory carrier module (MCM) 70 which, in accordance with the invention, comprises a substrate, such as a printed circuit board, having a plurality of memory modules (MM) 72-78 disposed upon a surface 71 thereof. Each of the MMs 72-78 may be identical in construction to the memory module 24 of FIG. 2a, that is, each of the MMs 72-78 comprises an integral reference and change table module (RCTM) 80-86, respectively. Each of the RCTMs 80-86 may be identical in construction to the RCTM 36 of FIG. 3. It should be realized that more or less than the four MMs shown may be provided on the MCM and that less than the possible maximum number may be installed at any given time. MCM 70 may comprise logic means, such as a memory carrier module control (MCM CONTROL) 88, which is operable for interfacing with the memory bus 27. In operation, MCM CONTROL 88 decodes the address and control buses to select a particular MM 72-78 for read or write access by the CPU 12 or I/O control 28. MCM CONTROL 88 may also be operable for generating the multiplexed row and column address signals on A0-A9, the RAS* and CAS* signals, and the logic signals associated with the RCTMs 80-86, such as RRCT*, TRCT* and UPPER. It can be appreciated that MCM CONTROL 88 may comprise a well-known DRAM controller type of device and other circuits, such as address decoders, and row and column address multiplexers. Of course, these MCM control functions may also be accomplished by the MCU 25 of FIG. 1, either operating alone or in conjunction with MCM control 88.

In order to activate only one of the MMs 72-78 MCM CONTROL 88 may have a number of CAS* outputs equal to the numbers of MMs installed, only one of the CAS* outputs being asserted for any given CPU 12 or I/O access. Similarly, the MCM CONTROL 88 may have a plurality of RRCT* and TRCT* outputs for individually activating the RCTMs 80-86.

That is, MCM CONTROL 88 may be operable for generating a common MM signal group 90 which includes those logic signals, such as A0-A9, UPPER, and RAS* which are provided in common to each of the MMs. MCM CONTROL 88 may further be operable for generating a plurality of MM specific signal groups 92-96, coupled to MMs 72-76, respectively. Each specific signal group is comprised of signals operable for activating only a selected MM, such as CAS*, W*, RRCT*, I/O and TRCT*.

For the illustrative MCM 70 of FIG. 5 the total storage capacity of the MCM 70 may vary from four megabytes to 16 megabytes of data, depending on the number of MMs installed. The total RCTM storage capacity therefore is similarly variable between 2048 and 8192 two bit words of data, corresponding to the total number of physical page frames represented by the installed memory capacity of MCM 70.

Figure 8:
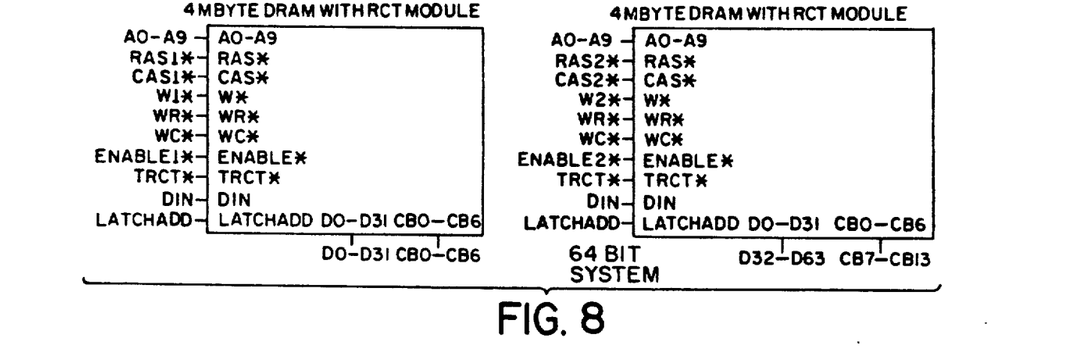
FIG. 8 is a block diagram showing two of the memory modules of FIG. 7 for use in a 64 data bit data processing system.
Figure 9:
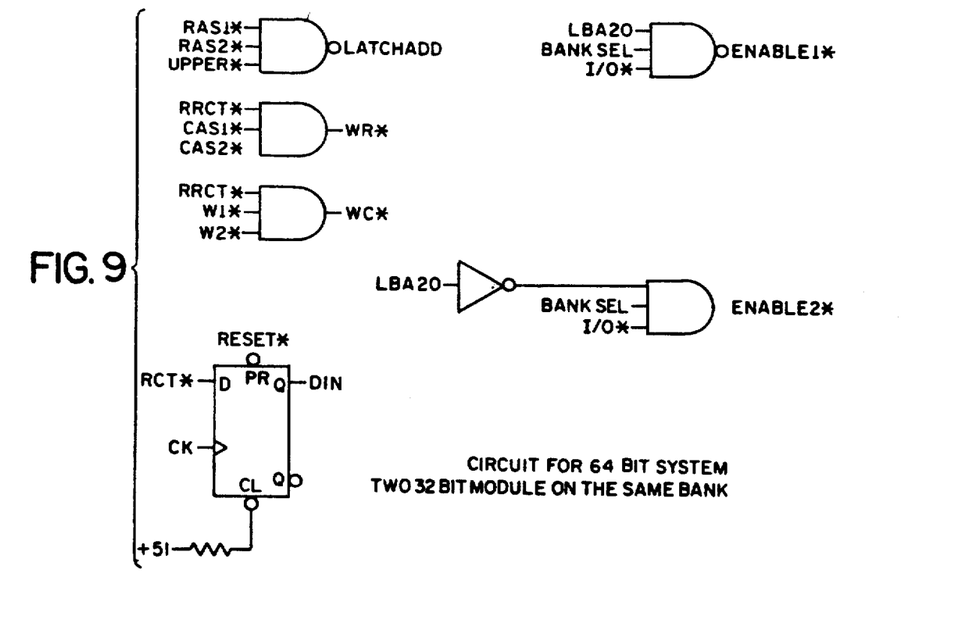
FIG. 9 shows one embodiment of circuitry operable for implementing the 64 bit system of FIG. 8.

The invention has been generally described thus far in the context of a system having a 32 bit data word. It should be realized however that the RCTM of the invention is not limited to use with 32 bit systems. Each memory module 72-78 may be comprised of 16 memory devices and a corresponding fewer number of error detection and correction memory devices coupled to a 16 bit data bus. In some systems however it may be desirable to employ an expanded data path, such as a data path comprised of 64 or 128 bits. A 64 bit system is illustrated in FIG. 8. Logic operable for generating certain of the RCTM input signal is shown schematically in FIG. 9.

For example, in such an expanded system the data bus may comprise data signal lines D00-D63 coupled to the MCM 70. The 32 bit MMs 72 and 74 may then each store one half of the 64 bit data word. For example, the lower 32 bits may be stored in MM 72 and the upper 32 bits in MM 74. In such a system MCM CONTROL 88 may comprise additional circuitry for bank selecting either or both of the MMs 72 and 74 depending upon the type of CPU access. A long word (64 bit) access would result in the selection of both MM 72 and 74 while a word access (32 bits) would select only one of the MMs 72 or 74. The bank selection would not only enable the memory devices upon the selected MM but would also enable the associated RCTM. In accordance with the invention, the decoded higher order address signal line modifies the state of an MM specific signal, such as ENABLE*. For example, the I/O* signal line may be combined with a BANK SEL signal as illustrated in FIG. 3. Thus, the modular RCTM of the invention may be readily employed in a number of different types of data processing systems having varying data word widths and/or depth.

As has been previously stated, a presently preferred embodiment of the invention has been disclosed herein. It is anticipated that those having skill in this art may envision modifications to this disclosed presently preferred embodiment. For example, although the RCTM is shown to comprise two separate memory devices 46 and 48, it is within the scope of the invention to provide one memory device having a storage capacity of two or more bits per address location. Thus, it is to be understood that the invention is not to be limited to this presently preferred embodiment but is instead to be limited only as defined by the appended claims.

What is claimed is:

1. Reference and change table storage means for a virtual memory data processing system having a plurality of data processors coupled through a system bus to a common physical memory means, the physical memory means being organized into n predetermined numbers of addressable units each of which comprises a plurality of physical memory address locations,, the reference and change table storage means comprising first means for recording an occurrence of an access to a specific address location within the physical memory means by one of the data processors, the reference and change table storage means further comprising second means for recording a type of access to the specific address location, the reference and change table storage means further comprising:

means, responsive to a first type of access by one of the data processors, for outputting to the system bus a content of a specified location within the first recording means and the second recording means; and means, responsive to a second type of access by one of the data processors, for resetting a specified location within the first recording means and the second recording means to indicate, for the corresponding memory unit, a nonaccessed condition; wherein said data processing system further comprises I/O means operable for accessing a specific address location within said memory means, said reference and change table storage means further comprising, means, responsive to a memory access by said I/O means, for disabling an operation of said reference and change table storage means.

2. Reference and change table storage means as defined in claim 1 wherein each of said data processors includes virtual memory controller means for generating a physical address in response to a virtual memory address, each of said virtual memory control means having an output coupled to the system bus for applying the physical address thereto.

3. Reference and change table storage means as defined in claim 2 wherein said reference and change table storage means comprises a predetermined number of storage locations at least equal in number to the predetermined number of addressable units, said reference and change table storage means further comprising means, responsive to the physical address applied to said system bus, for storing data at a storage location corresponding to one of the addressable units, the stored data being expressive of the occurrence of an access to and a type of access to the addressable unit, said reference and change table storage means further comprising means, responsive to an address received from said system bus, for outputting stored data to said system bus from a storage location corresponding to one of the addressable units.

4. Reference and change table storage means as defined in claim 1 wherein said system bus comprises:
 a plurality of address signal lines;
 a plurality of control signal lines; and
 a plurality of data lines having a least significant bit (LSB) and a most significant bit (MSB); and wherein
 certain of said plurality of control signal lines convey information expressive of a command for asserting a reset reference and change table signal, the assertion of which is operable for resetting a selected one of said reference and change table storage means storage locations to indicate a nonaccessed condition.

5. Reference and change table storage means as defined in claim 4 wherein:
 said certain of said plurality of control signal lines further convey information expressive of a command for asserting a test reference and change table signal, the assertion of which is operable for activating said reference and change table storage means for outputting the contents of a selected one of said storage location.

6. Reference and change table storage means as defined in claim 1 wherein said outputting means is responsive to the assertion of a test reference and change table signal for coupling a first and a second reference and change table storage means output signal line to predetermined ones of said system bus data lines for outputting thereto the content of a specified location within the first recording means and within the second recording means.

7. Reference and change table storage means as defined in claim 6 wherein said predetermined ones of of said data lines are said MSB and a (MSB-1).

8. Reference and change table storage means as defined in claim 1 wherein said system bus is coupled to a memory control unit, said memory control unit further being coupled through a plurality of memory means signal lines to said physical memory means, and wherein said reference and change table storage means is physically and electrically coupled to said memory control unit.

9. Reference and change table storage means as defined in claim 8 wherein said memory means signal lines comprise 32 data lines.

10. Reference and change table storage means as defined in claim 8 wherein said memory means signal lines comprise 64 data lines.

11. Reference and change table storage means as defined in claim 8 wherein said memory control unit includes means for arbitrating accesses to said reference and change table storage means, the accesses being made by said plurality of data processors.

12. Reference and change table storage means as defined in claim 8 wherein said reset reference and change table signal and said test reference and change table signal are each asserted by the execution of a privileged instruction type by one of said plurality of data processors.

13. A virtual memory data processing system having a plurality of data processing means coupled through a system bus to a memory control unit, said memory control unit being coupled to a physical memory means that is accessible by each of said plurality of data processing means, each of said plurality of data processing means including means for translating a virtual memory address to a physical memory address and for providing the physical memory address to said system bus for reception by said memory control unit, the physical memory means being organized into n predetermined numbers of addressable units each of which comprises a plurality of physical memory address locations, said memory control unit including reference and change table storage means that is responsive to physical memory addresses received from said system bus, said reference and change table storage means including storage means comprising first means for recording an occurrence of an access by one of the data processing means to one of the addressable units within the physical memory means, the reference and change table storage means further comprising second means for recording a type of access to the addressable unit, the reference and change table storage means further comprising means, responsive to a first type of access by one of the data processing means, for outputting to the system bus a content of a specified location within the first recording means and the second recording means; and means, responsive to a second type of access by one of the data processing means, for resetting a specified location within the first recording means and the second recording means to indicate, for the corresponding addressable unit, a nonaccessed condition.

14. A system as set forth in claim 13 and further comprising I/O means coupled to said system bus and operable for accessing a specific address location within said memory means, said reference and change table storage means further comprising means, responsive to a memory access by said I/O means, for disabling an operation of said reference storage and change table means so as not to record the occurrence of the access or the type of access.

15. A system as set forth in claim 13 wherein said memory control unit includes means for arbitrating accesses to said reference and change table storage means, the accesses being made by said plurality of data processing means.

16. A system as set forth in claim 13 wherein said system bus comprises:
a plurality of address signal lines;
a plurality of control signal lines; and
a plurality of data lines having a least significant bit (LSB) and a most significant bit (MSB); and wherein
certain ones of said plurality of control signal lines convey information expressive of a command for asserting a reset reference and change table signal, the assertion of which is operable for resetting a selected one of said reference and change table means storage locations to indicate a nonaccessed condition, said certain ones of said plurality of control signal lines further conveying information expressive of a command for asserting a test reference and change table signal, the assertion of which is operable for activating said reference and change table means for outputting the contents of a selected one of said storage locations.

17. A system as set forth in claim 16 wherein said reset reference and change table signal and said test reference and change table signal are each asserted by the execution of a privileged instruction type by one of said plurality of data processing means.

18. A system as set forth in claim 16 wherein said reference and change table storage means includes means, responsive to the assertion of said test reference and change table signal, for coupling a first and a second reference and change table means output signal line to predetermined ones of said system bus data lines.

19. A system as set forth in claim 15 wherein said predetermined ones of of said data lines are said MSB and a (MSB-1).

* * * * *